(12) United States Patent
Grevers, Jr. et al.

(10) Patent No.: US 9,692,723 B2
(45) Date of Patent: Jun. 27, 2017

(54) NETWORK MANAGEMENT OF DEVICES RESIDING BEHIND A NETWORK DEVICE

(71) Applicant: Cisco Technology, Inc., San Jose, CA (US)

(72) Inventors: Theodore Robert Grevers, Jr., Milford, MA (US); Roy Edward Osterberg, Clearlake, CA (US); Jason Charles Greengrass, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 90 days.

(21) Appl. No.: 14/719,346

(22) Filed: May 22, 2015

(65) Prior Publication Data

US 2016/0344689 A1    Nov. 24, 2016

(51) Int. Cl.
*H04B 7/212* (2006.01)
*H04L 29/12* (2006.01)
*H04L 12/721* (2013.01)
*H04L 12/741* (2013.01)

(52) U.S. Cl.
CPC ............ *H04L 61/103* (2013.01); *H04L 45/54* (2013.01); *H04L 45/66* (2013.01); *H04L 45/74* (2013.01); *H04L 61/256* (2013.01); *H04L 61/2514* (2013.01); *H04L 61/2535* (2013.01)

(58) Field of Classification Search
CPC ..... H04L 29/06; H04L 12/28; H04L 61/6022; H04L 45/72; H04L 61/103; H04L 61/256; H04L 45/66; H04L 45/74; H04L 45/54
USPC ........................................................ 370/442
See application file for complete search history.

(56) References Cited

U.S. PATENT DOCUMENTS

| | | | |
|---|---|---|---|
| 2006/0230103 A1* | 10/2006 | Takamoto | ............... H04L 69/40 709/203 |
| 2016/0105471 A1* | 4/2016 | Nunes | ................. H04L 12/4633 709/228 |

* cited by examiner

*Primary Examiner* — Sai-Ming Chan
(74) *Attorney, Agent, or Firm* — Merchant & Gould P.C.

(57) ABSTRACT

Network device management may be provided. By utilizing a network ID tag (i.e., a switch identifier) corresponding to a network switch, a network management platform on a server may access network devices that exist behind the network switch. The network switch may comprise a network address translation (NAT) device. The network devices may comprise an industrial network comprising groups of machines that exist as islands behind their own respective network switches where each group of machines may utilize the same internet protocol (IP) addresses as other group of machines in the industrial network.

16 Claims, 5 Drawing Sheets

| | | |
|---|---|---|
| 402 → first switch identifier 412 | first data link layer addr 414 | first network layer addr 416 |
| 404 → second switch identifier 418 | second data link layer addr 420 | second network layer addr 422 |
| 406 → third switch identifier 424 | third data link layer addr 426 | third network layer addr 428 |
| 408 → fourth switch identifier 430 | forth data link layer addr 432 | forth network layer addr 434 |
| 410 → fifth switch identifier 436 | fifth data link layer addr 438 | fifth network layer addr 440 |

NETWORK MANAGEMENT OF DEVICES RESIDING BEHIND A NETWORK DEVICE

TECHNICAL FIELD

The present disclosure relates generally to network device management.

BACKGROUND

With the explosion of the Internet and the increase in home networks and business networks, the numbers of available IP addresses are not enough. One solution may be to redesign the address format to allow for more possible addresses. While this may be implemented, it may take many years to implement because it may require modification of the entire infrastructure of the Internet.

Network address translation (NAT) is a method of remapping one Internet Protocol (IP) address space into another by modifying network address information in IP datagram packet headers while they are in transit across a traffic routing device. The method was used for ease of rerouting traffic in IP networks without renumbering every host. It has become a way of conserving global address space allocations in face of address exhaustion.

BRIEF DESCRIPTION OF THE FIGURES

The accompanying drawings, which are incorporated in and constitute a part of this disclosure, illustrate various embodiments of the present disclosure. In the drawings:

FIG. 4 is a block diagram of a management table in accordance with at least one example embodiment.

DETAILED DESCRIPTION

Overview

Figure 1:
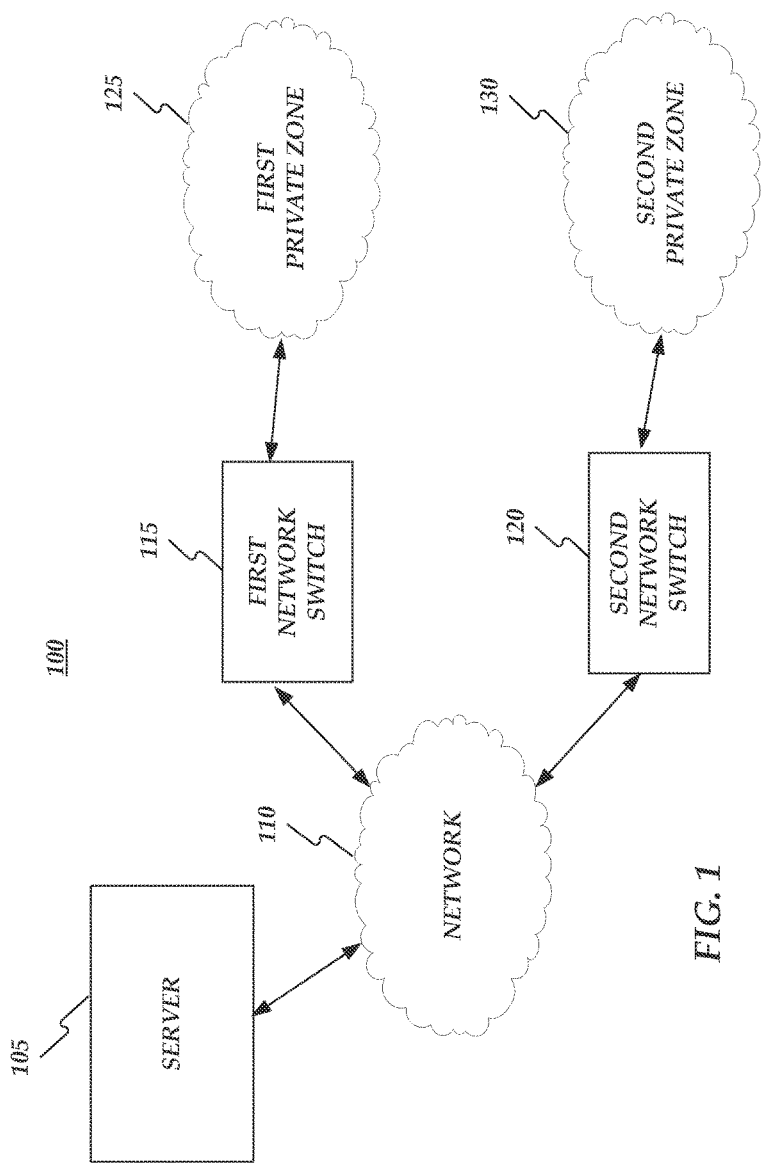
FIG. 1 is a block diagram of an operating environment for providing network device management in accordance with at least one example embodiment.

Network device management may be provided. By utilizing a network ID tag (i.e., a switch identifier) corresponding to a network switch, a network management platform on a server may access network devices that exist behind the network switch. The network switch may comprise a network address translation (NAT) device. The network devices may comprise an industrial network comprising groups of machines that exist as islands behind their own respective network switches where each group of machines may utilize the same internet protocol (IP) addresses as other group of machines in the industrial network.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

In an industrial environment, network devices and their connected machines may exist and may be isolated behind a network switch comprising a NAT device. The isolated network environment may comprise a private zone. Within such environments, behind a NAT device, an automation control system ring comprising switches, controllers, and machines may operate utilizing the same network address ranges as other neighboring rings of equipment in the same private zones. In such environments, independent rings each may utilize the same IP address range while behind their own respective network switch (e.g., NAT device) because the machine (e.g., robot) builders may build a collection of machines with the same IP address. The NAT device may allow for the network edge of the Cell/Area Zone to exist, and the networks behind the NAT device to co-exist within the same plant where the machines utilize the same IP address range.

A problem network managers may experience when utilizing a NAT device, may be the lack of a way to manage network devices behind the NAT device. Embodiments of the disclosure may allow for a centralized network management system to maintain control, which can manage the network devices that exist behind the NAT device without the need for special port address translation or other processes that may compromise security functions of the NAT device. For some industrial users, an industrial Ethernet switch may function as a connected router, where "NATed" routing functions may happen at an Ethernet switch, separating the subnet behind the switch from the plant network that connects all of the Cell/Area Zones.

Embodiments of the disclosure may comprise an apparatus or software module within a network switch (e.g., a NAT device) that may utilize a combination of the network switch's own media access control (MAC) address table, address resolution protocol (ARP) table, and a unique tag identifier (e.g., switch identifier corresponding to the network switch) to allow for a centralized management system (e.g., on a server) to manage network devices that may exist behind the network switch. To switch frames between local area network (LAN) ports efficiently, the network switch may maintain a MAC address table. When the network switch receives a frame, it may associate the MAC address of the sending network device with the LAN port on which it was received.

The network switch may dynamically build the MAC address table by using the MAC source address of the frames received. Consistent with embodiments of the disclosure, the MAC address table may comprise a source of data utilized. In addition, an administrator can also manually enter a MAC address, which is termed a static MAC address, into the network switch's MAC address. These static MAC entries may be retained across a reboot of the network switch.

In addition to the data table of MAC addresses (e.g., layer 2 addresses or data link layer addresses) that may be held in the network switch, embodiments of the disclosure may also map the IP addresses (e.g., layer 3 addresses or network layer addresses) of each device attached to the network switch based on data held in the ARP table. A network switch may not track all IP addresses unless the network switch initiates a ping to a specific IP address or the broadcast address of the subnet (or VLAN) that the devices are attached from which the ARP table is populated.

The network switch may have access to two types of data: i) a MAC table; and ii) an ARP table. Once created, the network switch may communicate, to the server, a management table that includes an added switch identifier tag preamble (e.g., switch identifier) for each MAC and IP address pair for each device connected to the network device.

Each entry in the management table may include: [switch ID tag][MAC Address][IP address] corresponding to respective switches connected to the network switch. The [switch ID tag] field (e.g., corresponding to the switch identifier) may allow for the server (e.g., simple network management protocol (SNMP) management platform) to identify which network switch it should contact to send SNMP management traffic for a given network device that exists behind the network switch. The [MAC Address] field may allow for the server to discover the MAC address of the network device attached behind the network switch. The private side [IP Address] may be reported to the server as an identification data point. The non-routable private address utilized by a network device behind the network switch may be shared for management and reporting purposes. Once the initial table pairs [MAC and IP] have been communicated to the server, the network switch may receive and distribute, for example, SNMP management traffic between the server and network devices with private IP addresses behind the network switch.

Embodiments of the disclosure may utilize an encrypted communication process to convey SNMP traffic between the server and the network switch. This may allow for the SNMP traffic to be both protected and also sent directly to the proper network switch, embedded apparatus, and ultimately private network addressed network device.

Although SSH may be used for the encryption of SNMP traffic, embodiments of this disclosure may include the secure use of extensible messaging and presence protocol (XMPP) via TLS, as a light weight, transmission control protocol (TCP) based method to encapsulate SNMP's user datagram protocol (UDP) traffic securely. Through the use of XMPP, near real-time presence information can be initiated by either the server or the network switch. This approach may establish publish-subscribe model of SNMP management communications.

An XMPP message from the network switch to the server may identify the apparatus as the [switch ID tag] client address, the [network management platform] as the server, and the message payload as the encapsulated SNMP server command or client response. Below is an example of a command issued by the server (e.g., network management platform) to the network switch:

```
C: <?xml version='1.0'?>
<stream:stream
to='switch_ID_tag:MAC_Address'
xmlns='jabber:client'
xmlns:stream='http://etherx.jabber.org/streams'
version='1.0'>
```

-continued

```
S: <?xml version='1.0'?>
<stream:stream
from='network_management_platform'
id='someid'
xmlns='jabber:client'
xmlns:stream='http://etherx.jabber.org/streams'
version='1.0'>
C: <message from='network_management_platform'
to='switch_ID_tag:MAC_Address'
xml:lang='en'>
C: <body>show management event</body>
C: </message>
S: <message from='switch_ID_tag:MAC_Address'
to='network_management_system'
xml:lang='en'>
```

The above example, illustrates the issuance of the "show management event" by the server via XMPP to the network switch to pass to the private side network device [MAC Address] that exists behind the network switch [switch ID tag]. The command may be issued to an apparatus or software module within the network switch and then issued to the MAC address of the network device that resides behind the network switch. In response, the network switch may issue the SNMP command to the network device. A response to the command may be captured by the network switch, encapsulated into XMPP, and communicated back to the server.

The network switch compares the MAC Address designated in the XMPP command to determine the private side IP address of the network device that the SNMP command is destined. XMPP may utilize a publish and subscribe model, which allows for commands and notifications to be initiated by the network switch at any time, allowing for real-time notification of events, traps, and the discovery of new devices that may have communicated on the network behind the network device and made a new entry into the MAC address table.

Embodiments of the disclosure may provide an automated process for the discovery of network devices that exist behind a NAT device (e.g., network switch). Through the use of the network switch, SNMP management from the server may communicate with network devices that exist behind the network switch in private address space. A lightweight and secure XMPP for real-time communications may be used between the server and network devices that exist in a private network address space behind the network switch.

The network switch may use data sources, such as a MAC address table and an ARP table to identify all network devices that exist behind the network switch. By utilizing a network ID tag (e.g., switch identifier), embodiments of the disclosure may provide the server (e.g., network management platform) access to network devices that may exist behind the network switch (e.g., NAT device) without the need to utilize port address translation, or introduce a "hole" in the NAT device.

Embodiments of the disclosure, for example, may allow for industrial networks to deploy "Connected Routing" architecture, where groups of machines may exist as islands behind their own NAT devices, where each island of machines may utilize the same IP Addresses.

FIG. 1 is a block diagram of an operating environment 100 in accordance with embodiments of the disclosure. As shown in FIG. 1, operating environment 100 may comprise a server 105, a network 110, a first network switch 115, and a second network switch 120. A first private zone 125 may be connected to first network switch 115 and a second private zone 130 may be connected to second network switch 120. First private zone 125 may comprise a first plurality of network devices. Second private zone 130 may comprise a second plurality of network devices. The network devices (i.e., the first plurality of network devices and the second plurality of network devices together) may comprise an industrial network comprising groups of machines. For example, the first plurality of network devices may comprise a first group of machines in the industrial network and the second plurality of network devices may comprise a second group of machines in the industrial network.

Network 110 may comprise any type of network (e.g., the Internet, a hybrid fiber-coaxial (HFC) network, a content delivery network (CDN), etc.). Server 105 may comprise a network management platform that may communicate with the first plurality of network devices through first network switch 115 and that may communicate with the second plurality of network devices through second network switch 120. The network management platform may be utilized by an enterprise that desires to monitor, operate, or determine the status (i.e., communicate) of various devices within the industrial network.

Figure 2:
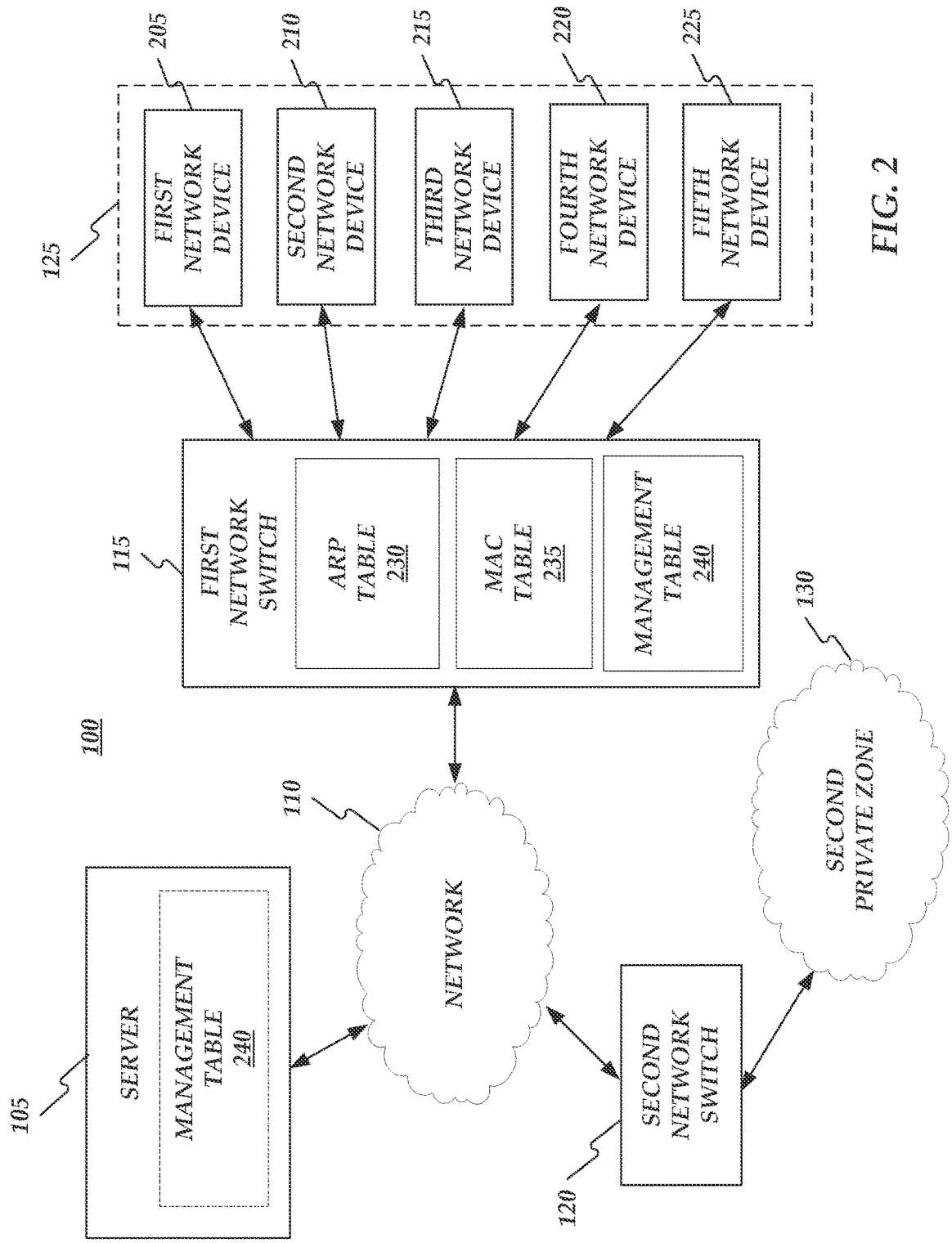
FIG. 2 is a block diagram of an operating environment for providing network device management in accordance with at least one example embodiment.

FIG. 2 is a block diagram of operating environment 100 in accordance with embodiments of the disclosure from FIG. 1 shown in greater detail. As shown in FIG. 1, first network switch 115 may comprise an address resolution protocol (ARP) table 230, a media access control (MAC) table 235, and a management table 240. Second network switch 120 may be similar to first network switch 115.

As stated above, first private zone 125 may comprise a first plurality of network devices. The first plurality of network devices may comprise a first network device 205, a second network device 210, a third network device 215, a fourth network device 220, and a fifth network device 225. The second plurality of network devices may be similar to the first plurality of network devices. For example, first network device 205 may comprise a robot arm, second network device 210 may comprise a monitor, third network device 215 may comprise a controller, fourth network device 220 may comprise a transducer, and a fifth network device 225 may comprise a camera.

Consistent with embodiment of the disclosure, the network devices (i.e., the first plurality of network devices and the second plurality of network devices together) may comprise an industrial network comprising groups of machines (e.g., the first plurality of network devices being a first group and the second plurality of network devices being a second group). Each of these groups of machines may exist as an island behind their own respective network switch (e.g., first network switch 115 for the first plurality of network devices and second network switch 120 for the second plurality of network devices).

Each of these groups of machines may utilize redundant internet protocol (IP) addresses as other groups of machines in the industrial network. For example, a first robot arm comprising one of the first plurality of network devices grouped into first private zone 125 may have the same IP address as a second robot arm comprising one of the second plurality of network devices grouped into second private zone 130. However, by utilizing a first network ID tag (i.e., a first switch identifier) corresponding to first network switch 115, the network management platform on server 105 may access any of the first plurality of network devices that exist behind first network switch 115 even though there may be redundancy of IP addresses between the first plurality of network devices and the second plurality of network devices.

Figure 3:
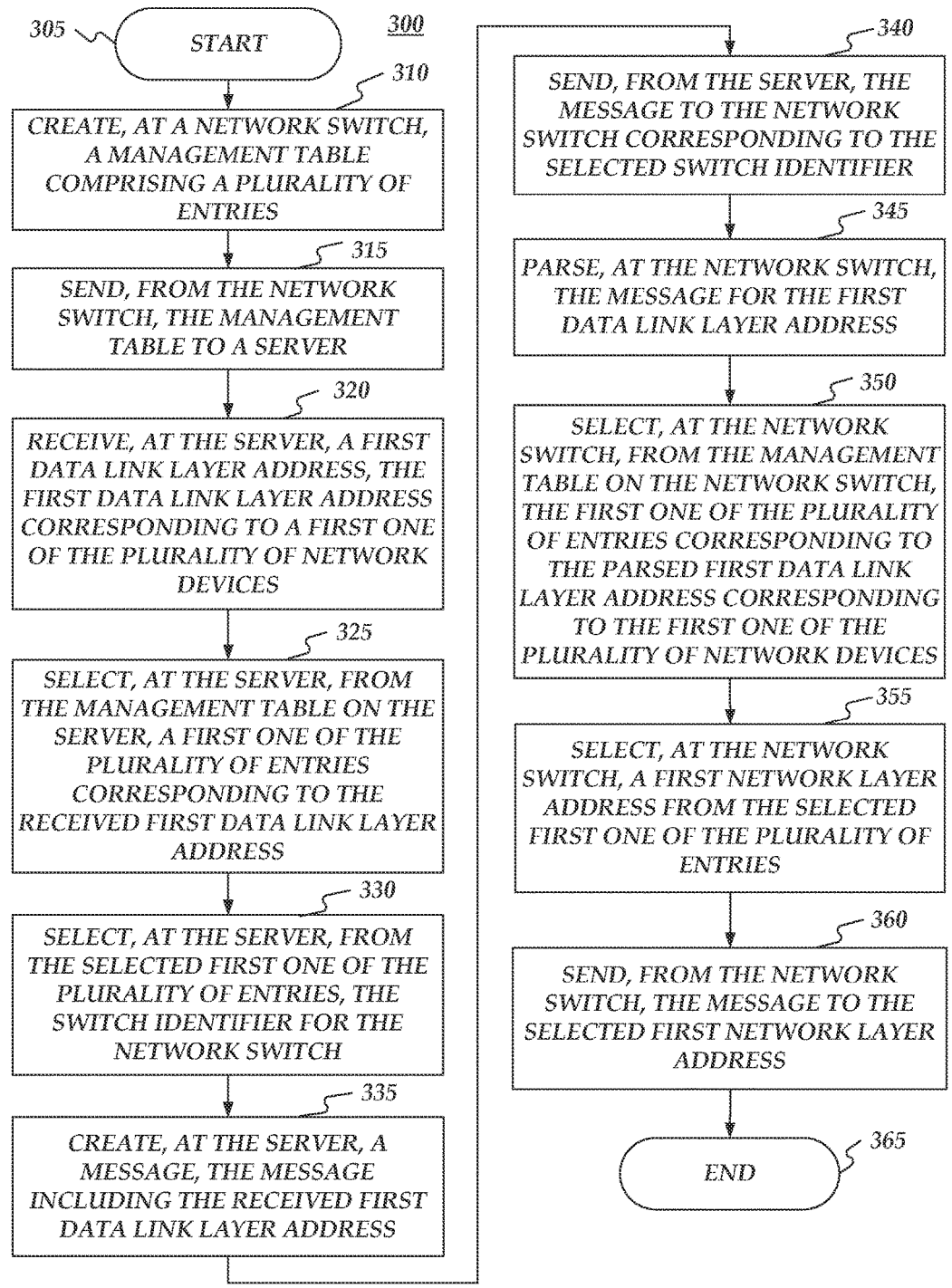
FIG. 3 is a flow chart of a method for providing network device management in accordance with at least one example embodiment.

FIG. 3 is a flow chart setting forth the general stages involved in a method 300 consistent with an embodiment of the disclosure for providing network management. Method 300 may be implemented using, for example, server 105 and first network switch 115 as described in more detail below with respect to FIG. 5. Ways to implement the stages of method 300 will be described in greater detail below.

Method 300 may begin at starting block 305 and proceed to stage 310 where first network switch 115 may create management table 240. ARP table 230 and MAC table 235 may be automatically populated by first network switch 115 as data traffic to and from the first plurality of network devices traverses first network switch 115. MAC table 235 may contain a listing of all the data link layer addresses (e.g., MAC addresses) of all the network devices (i.e., the first plurality of network devices) connected to ports on first network switch 115. Similarly, ARP table 230 may contain a listing of all the network layer link layer addresses (e.g., IP addresses) of all the network devices (i.e., the first plurality of network devices) connected to ports on first network switch 115.

Using MAC table 235 and ARP table 230, first network switch 115 may create management table 240. FIG. 4 is a block diagram of management table 240. As shown in FIG. 4, management table 240 may comprise a plurality of entries 400. Plurality of entries 400 may comprise a first entry 402, a second entry 404, a third entry 406, a fourth entry 408, and a fifth entry 410. First entry 402 may correspond to first network device 205 and may include a first switch identifier 412, a first data link layer address 414, and a first network layer address 416. First switch identifier 412 may correspond to first network switch 115, first data link layer address 414 may comprise the MAC address of first network device 205, and first network layer address 416 may comprise the IP address of first network device 205.

Second entry 404 may correspond to second network device 210 and may include a second switch identifier 418, a second data link layer address 420, and a second network layer address 422. Second switch identifier 418 may correspond to first network switch 115, second data link layer address 420 may comprise the MAC address of second network device 210, and second network layer address 422 may comprise the IP address of second network device 210.

Third entry 406 may correspond to third network device 215 and may include a third switch identifier 424, a third data link layer address 426, and a third network layer address 428. Third switch identifier 424 may correspond to first network switch 115, third data link layer address 426 may comprise the MAC address of third network device 215, and third network layer address 428 may comprise the IP address of third network device 215.

Fourth entry 408 may correspond to fourth network device 220 and may include a fourth switch identifier 430, a fourth data link layer address 432, and a fourth network layer address 434. Fourth switch identifier 430 may correspond to first network switch 115, fourth data link layer address 432 may comprise the MAC address of fourth network device 220, and fourth network layer address 434 may comprise the IP address of fourth network device 220.

Fifth entry 410 may correspond to fifth network device 225 and may include a fifth switch identifier 436, a fifth data link layer address 438, and a fifth network layer address 440. Fifth switch identifier 436 may correspond to first network switch 115, fifth data link layer address 438 may comprise the MAC address of fifth network device 225, and fifth network layer address 440 may comprise the IP address of fifth network device 225. Because the first plurality of network devices may be connected to first network switch 115, first switch identifier 412, second switch identifier 418, third switch identifier 424, fourth switch identifier 430, and fifth switch identifier 436 may all be the same.

From stage 310, where first network switch 115 creates management table 240, method 300 may advance to stage 315 where first network switch 115 may send management table 240 to server 105. For example, first network switch 115 may subscribe to a publisher function introduced to the network management platform running on server 105. The subscription process may be complete once first network switch 115 authenticates with the publisher and an encrypted transport layer security (TLS) session, for example, is established between server 105 and first network switch 115. Management table 240 may then be sent using the established session to the network management platform (e.g., via XMPP). As network devices are added or removed from first network switch 115, their addition/removal is discovered by first network switch 115 and an updated management table may be reported to the network management platform on server 105 in real-time for example.

Once first network switch 115 sends management table 240 to server 105 in stage 315, method 300 may continue to stage 320 where server 105 may receive a first data link layer address. For example, the network management platform running on server 105 may be utilized by an enterprise that desires to communicate with (e.g., monitor, operate, or determine the status of) first network device 205. Consequently, the first data link layer address received by the network management platform may correspond to a first one of the plurality of network devices (e.g., first network device 205). Accordingly, the received first data link layer address may comprise the MAC address of first network device 205.

After server 105 receives the first data link layer address in stage 320, method 300 may proceed to stage 325 where server 105 may select from management table 240 on server 105, a first one of the plurality of entries corresponding to the received first data link layer address. For example, the network management platform running on server 105 may query management table 240 and determine that the received first data link layer address corresponds to first data link layer address 414. Consequently, first entry 402 may be selected from management table 240.

From stage 325, where server 105 selects the first one of the plurality of entries corresponding to the received first data link layer address from management table 240, method 300 may advance to stage 330 where server 105 may select from the selected first one of the plurality of entries, the switch identifier for first network switch 115. For example, the network management platform running on server 105 may select first switch identifier 412 from first entry 402. First switch identifier 412 may comprise a switch identifier for first network switch 115.

Once server 105 selects the switch identifier for first network switch 115 from first entry 402 in stage 330, method 300 may continue to stage 335 where the network management platform, running on server 105, may create a message. For example, because the enterprise may desire to communicate with first network device 205, the created message may include first data link layer address 414 (e.g., the MAC address of first network device 205). An example of the message may comprise the example command described above.

After server 105 creates the message in stage 335, method 320 may proceed to stage 340 where server 105 may send the message to first network switch 115. For example, server 105 may send the message to first network switch 115 because first network switch 115 may correspond to the selected switch identifier form first entry 402 selected above. The message may comprise an XMPP message.

From stage 340, where server 105 sends the message to first network switch 115, method 300 may advance to stage 345 where first network switch 115 may parse the message for a data link layer address to which the message may be destined. For example, first network switch 115 may parse the message and determine that it is destined for first network device 205 because the message may include the data link layer address (e.g., MAC address) for first network device 205.

Once first network switch 115 parses the message in stage 345, method 300 may continue to stage 350 where first network switch 115 may select, from management table 240 on first network switch 115, the first one of the plurality of entries corresponding to the parsed first data link layer address corresponding to the first one of the plurality of network devices (e.g., first network device 205). For example, first network switch 115 may parse management table 240 on first network switch 115 and determine that the data link layer address in the received message corresponds to first data link layer address 414. Consequently, first network switch 115 may select first entry 402 and then select first network layer address 416 from first entry 402.

After first network switch 115 selects from management table 240 in stage 350, method 320 may proceed to stage 355 where first network switch 115 may select a first network layer address from the selected first one of the plurality of entries. For example, because first network switch 115 selected first entry 402, first network switch 115 may then select first network layer address 416 from first entry 402. First network layer address 416 may comprise the IP address of first network device 205.

From stage 355, where first network switch 115 selects the network layer address (e.g., IP address) of first network device 205, method 300 may advance to stage 360 where first network switch 115 may send the message to the selected first network layer address. For example, first network switch 115 may send the message to the IP address of first network device 205 thus forwarding the message to first network device 205. In response, first network switch 115 may capture any response produced by first network device 205. The response may be encapsulated into an XMPP formatted message. The formatted message may then be sent to the network management platform running on server 105 via the authenticated and encrypted XMPP session. Once first network switch 115 sends the message in stage 360, method 300 may then end at stage 365.

Figure 5:
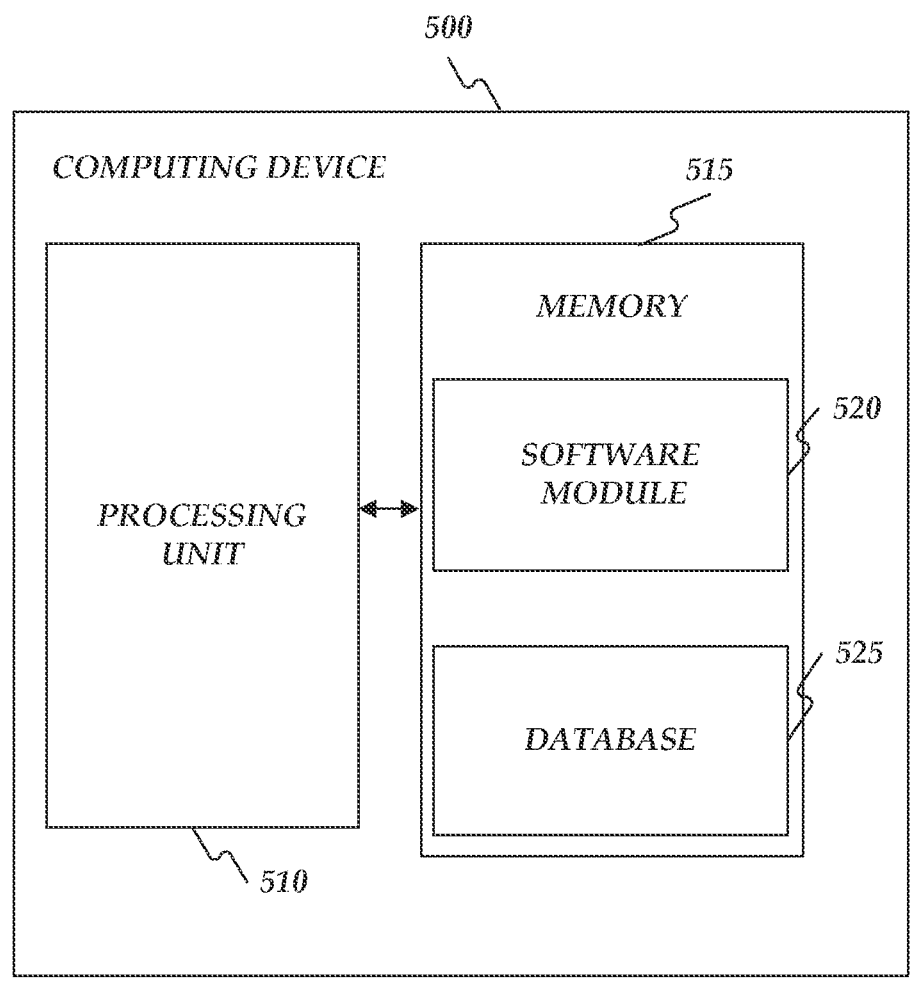
FIG. 5 is a block diagram of a computing device in accordance with at least one example embodiment.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform processes for providing network management including, for example, any one or more of the stages from method 300 described above with respect to FIG. 3. Computing device 500, for example, may provide an operating environment for any one or more of server 105, first network switch 115, second network switch 120, first network device 205, second network device 210, third network device 215, fourth network device 220, and fifth network device 225. Server 105, first network switch 115, second network switch 120, first network device 205, second network device 210, third network device 215, fourth network device 220, and fifth network device 225 may operate in other environments and is not limited to computing device 300.

Computing device 500 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. Furthermore, computing device 500 may comprise, for example, a mobile terminal, such as a smart phone, a cellular telephone, a cellular telephone utilizing Wireless Application Protocol (WAP) or unlicensed mobile access (UMA), personal digital assistant (PDA), intelligent pager, portable computer, a hand held computer, a conventional telephone, or a Wireless Fidelity (Wi-Fi) access point. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 2 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    creating, at a network switch, a management table comprising a plurality of entries, each of the plurality of entries respectively corresponding a plurality of network devices connected to the network switch, each of the plurality of entries respectively comprising a switch identifier for the network switch, a data link layer address corresponding to its respective one of the plurality of network devices, and a network layer address corresponding to its respective one of the plurality of network devices;
sending, from the network switch, the management table to a server;
receiving, at the server, a first data link layer address, the first data link layer address corresponding to a first one of the plurality of network devices;
selecting, at the server, from the management table on the server, a first one of the plurality of entries corresponding to the received first data link layer address;
selecting, at the server, from the selected first one of the plurality of entries, the switch identifier for the network switch;
creating, at the server, a message, the message including the received first data link layer address;
sending, from the server, the message to the network switch corresponding to the selected switch identifier;
parsing, at the network switch, the message for the first data link layer address;
selecting, at the network switch, from the management table on the network switch, the first one of the plurality of entries corresponding to the parsed first data link layer address corresponding to the first one of the plurality of network devices;
selecting, at the network switch, a first network layer address from the selected first one of the plurality of entries; and
sending, from the network switch, the message to the selected first network layer address.

2. The method of claim 1, further comprising:
receiving, at the network switch, a response to the message; and
sending, from the network switch to the server, the response to the message.

3. The method of claim 1, wherein creating the management table comprises creating the management table wherein the data link layer address comprises a media access control (MAC) address.

4. The method of claim 1, wherein creating the management table comprises creating the management table wherein the data link layer address comprises an Internet Protocol (IP) address.

5. The method of claim 1, wherein creating the management table comprises creating the management table wherein the plurality of network devices comprise an industrial network.

6. The method of claim 1, wherein creating the management table comprises creating the management table wherein the plurality of network devices comprise an industrial network, the plurality of network devices having Internet Protocol (IP) addresses redundant with other groups of machines in the industrial network.

7. The method of claim 1, wherein creating the management table comprises creating the management table using at least one of the follow on the network switch: an address resolution protocol (ARP) table; and a media access control (MAC) table.

8. The method of claim 1, wherein sending, from the network switch, the management table to a server comprises sending from the network switch comprising a network address translation (NAT) device.

9. A method comprising:
receiving, at a server, a first data link layer address, the first data link layer address corresponding to a first one of a plurality of network devices;
selecting, at the server, from a management table on the server, a first one of the plurality of entries corresponding to the received first data link layer address;
selecting, at the server, from the selected first one of the plurality of entries, a switch identifier for a network switch;
creating, at the server, a message, the message including the received first data link layer address;
sending, from the server, the message to the network switch corresponding to the selected switch identifier;
parsing, at the network switch, the message for the first data link layer address;
selecting, at the network switch, from the management table on the network switch, the first one of the plurality of entries corresponding to the parsed first data link layer address corresponding to the first one of the plurality of network devices;
selecting, at the network switch, a first network layer address from the selected first one of the plurality of entries; and
sending, from the network switch, the message to the selected first network layer address.

10. The method of claim 9, wherein receiving at a server comprises receiving at a server comprising a network address translation (NAT) device.

11. The method of claim 9, further comprising:
receiving, at the network switch, a response to the message; and
sending, from the network switch to the server, the response to the message.

12. The method of claim 9, further comprising:
creating, at the network switch, the management table comprising the plurality of entries, each of the plurality of entries respectively corresponding the plurality of network devices connected to the network switch, each of the plurality of entries respectively comprising a switch identifier for the network switch, a data link layer address corresponding to its respective one of the plurality of network devices, and a network layer address corresponding to its respective one of the plurality of network devices; and
sending, from the network switch, the management table to the server.

13. The method of claim 9, wherein receiving the first data link layer address, the first data link layer address corresponding to the first one of a plurality of network devices comprises receiving the first data link layer address, the first data link layer address corresponding to the first one of a plurality of network devices wherein the plurality of network devices comprise an industrial network.

14. The method of claim 9, wherein receiving the first data link layer address, the first data link layer address corresponding to the first one of a plurality of network devices comprises receiving the first data link layer address, the first data link layer address corresponding to the first one of a plurality of network devices wherein the plurality of network devices comprise an industrial network, the plurality of network devices having Internet Protocol (IP) addresses redundant with other groups of machines in the industrial network.

15. A system comprising:
a first memory storage; and
a first processing unit coupled to the first memory storage, wherein the first processing unit is configured to:
receive a first data link layer address, the first data link layer address corresponding to a first one of a plurality of network devices;

select from a management table, a first one of the plurality of entries corresponding to the received first data link layer address;

select from the selected first one of the plurality of entries, a switch identifier for a network switch;

create a message, the message including the received first data link layer address; and send the message to the network switch corresponding to the selected switch identifier.

16. The system of claim 15, further comprising:

a second memory storage; and a second processing unit coupled to the second memory storage, wherein the second processing unit is configured to:

parse the message for the first data link layer address;

select from the management table, the first one of the plurality of entries corresponding to the parsed first data link layer address corresponding to the first one of the plurality of network devices;

select a first network layer address from the selected first one of the plurality of entries; and send the message to the selected first network layer address.

* * * * *